US012680630B2

(12) United States Patent
Traidia et al.

(10) Patent No.: US 12,680,630 B2
(45) Date of Patent: Jul. 14, 2026

(54) MULTILAYER PERMEATION BARRIER FOR SPOOLABLE COMPOSITE PIPES

(71) Applicants: SAUDI ARABIAN OIL COMPANY, Dhahran (SA); TWI Ltd., Cambridge (GB)

(72) Inventors: Abderrazak Traidia, Lussan (FR); Abdullah Al Shahrani, Dammam (SA); Anwar Parvez, Dhahran (SA); Bernadette Craster, Cambridge (GB)

(73) Assignees: SAUDI ARABIAN OIL COMPANY, Dhahran (SA); TWI Ltd., Cambridge (GB)

( * ) Notice: Subject to any disclaimer, the term of this patent is extended or adjusted under 35 U.S.C. 154(b) by 571 days.

(21) Appl. No.: 18/316,435

(22) Filed: May 12, 2023

(65) Prior Publication Data

US 2024/0377002 A1 Nov. 14, 2024

(51) Int. Cl.
*F16L 11/08* (2006.01)
*B29C 48/00* (2019.01)
(Continued)

(52) U.S. Cl.
CPC ............ *F16L 11/08* (2013.01); *B29C 48/022* (2019.02); *B29C 48/10* (2019.02); *B29C 48/151* (2019.02);
(Continued)

(58) Field of Classification Search
CPC ....... B29C 48/022; B29C 48/10; B29C 48/21; B29C 48/151; F16L 11/08; F16L 58/1045; B29L 2023/005
(Continued)

(56) References Cited

U.S. PATENT DOCUMENTS 5,570,711 A 11/1996 Walsh
5,957,164 A 9/1999 Campbell
(Continued)

FOREIGN PATENT DOCUMENTS

CA 2 619 808 C 4/2015
CN 104960251 A 10/2015
(Continued)

OTHER PUBLICATIONS

M. M. Ali, et al., "Corrosion protection of steel pipelines with metal-polymer composite barrier liners", Journal of Natural Gas Science and Engineering, Sep. 1, 2020, vol. 81, 103401, pp. 1-7 (7 pages).
(Continued)

*Primary Examiner* — David R Deal
(74) *Attorney, Agent, or Firm* — Osha Bergman Watanabe & Burton LLP

(57) ABSTRACT

Spoolable composite pipes, a method of producing spoolable composite pipes, and a method for transporting a hydrocarbon fluid are provided. The spoolable composite pipes have an inner extruded tubular liner, a backer layer surrounding the inner extruded tubular liner, and a reinforcement layer surrounding the backer layer. The backer layer includes a polypropylene, and the inner extruded tubular liner includes a thermoplastic. The production method includes co-extruding the inner extruded tubular liner with the backer layer, providing the reinforcement layer, and extruding the cover layer around the reinforcement layer. The method for transporting a hydrocarbon fluid includes providing the spoolable composite pipe and introducing the hydrocarbon fluid with an aromatic content of up to about 35% by volume based on the total hydrocarbons content.

20 Claims, 9 Drawing Sheets

100

109 107 105 103 101

111

(51) Int. Cl.
*B29C 48/10* (2019.01)
*B29C 48/151* (2019.01)
*B29C 48/21* (2019.01)
*F16L 58/10* (2006.01)
*B29L 23/00* (2006.01)

(52) U.S. Cl.
CPC .......... *B29C 48/21* (2019.02); *F16L 58/1045* (2013.01); *B29L 2023/005* (2013.01)

(58) Field of Classification Search
USPC ........................................................ 138/124
See application file for complete search history.

(56)  References Cited

U.S. PATENT DOCUMENTS

| | | | |
|---|---|---|---|
| 6,039,085 A | 3/2000 | Hsich | |
| 6,180,197 B1 | 1/2001 | Nie et al. | |
| 6,240,970 B1 | 6/2001 | Ostrander et al. | |
| 6,257,281 B1 | 7/2001 | Nie et al. | |
| 6,374,862 B1 | 4/2002 | Schwert | |
| 6,378,562 B1 | 4/2002 | Noone et al. | |
| 6,852,188 B2 | 2/2005 | Stripe | |
| 6,989,198 B2 | 1/2006 | Masuda et al. | |
| 7,001,446 B2 | 2/2006 | Roark et al. | |
| 7,550,185 B2 | 6/2009 | Ling et al. | |
| 7,866,348 B2 | 1/2011 | Garver et al. | |
| 8,470,423 B2 | 6/2013 | Jarvenkyla | |
| 8,678,042 B2 | 3/2014 | Quigley et al. | |
| 8,763,647 B2 | 7/2014 | Quigley et al. | |
| 8,789,597 B2 | 7/2014 | Al-Shammari | |
| 9,289,966 B2 | 3/2016 | Fischer et al. | |
| 9,395,022 B2 | 7/2016 | Glejbol | |
| 9,772,052 B2 | 9/2017 | Garver et al. | |
| 9,982,809 B2 | 5/2018 | Nadeau et al. | |
| 10,513,581 B2 | 12/2019 | Jeol et al. | |
| 10,816,113 B2 | 10/2020 | Berger et al. | |
| 10,889,081 B2 | 1/2021 | Kremer et al. | |
| 11,149,879 B2 | 10/2021 | Berger et al. | |
| 11,300,231 B2 | 4/2022 | Jaspaert | |
| 2001/0021426 A1 | 9/2001 | Procida et al. | |
| 2003/0087052 A1 | 5/2003 | Wideman et al. | |
| 2004/0035485 A1 | 2/2004 | Gleim et al. | |
| 2004/0194838 A1 | 10/2004 | Glejbol et al. | |
| 2005/0217747 A1 | 10/2005 | Buriak et al. | |
| 2006/0191587 A1 | 8/2006 | Gerez et al. | |
| 2008/0006338 A1* | 1/2008 | Wideman | F16L 11/081 |
| | | | 138/124 |
| 2008/0187701 A1 | 8/2008 | Dabouineau | |
| 2008/0210329 A1 | 9/2008 | Quigley et al. | |
| 2009/0286028 A1 | 11/2009 | Garver et al. | |
| 2013/0306652 A1 | 11/2013 | Andernach et al. | |
| 2014/0182735 A1 | 7/2014 | Dyksterhouse | |
| 2015/0044407 A1 | 2/2015 | Som et al. | |
| 2015/0053293 A1 | 2/2015 | Ophaug | |
| 2016/0069503 A1 | 3/2016 | Messina et al. | |
| 2017/0227160 A1 | 8/2017 | Reichel et al. | |
| 2019/0162335 A1* | 5/2019 | Yu | F16L 11/16 |
| 2020/0080236 A1 | 3/2020 | Fischer et al. | |
| 2020/0180258 A1 | 6/2020 | Makadia | |
| 2021/0356056 A1 | 11/2021 | Doufas et al. | |
| 2022/0373107 A1 | 11/2022 | Traidia et al. | |
| 2023/0133171 A1* | 5/2023 | Anantha | F16L 59/153 |
| | | | 138/124 |

FOREIGN PATENT DOCUMENTS

| | | | |
|---|---|---|---|
| CN | 107940123 A | 4/2018 | |
| CN | 114456470 A | 5/2022 | |
| EP | 728976 B1 | 1/1999 | |
| EP | 1563007 B1 | 3/2007 | |
| EP | 2 990 707 A1 | 3/2016 | |
| EP | 3301122 A1 | 4/2018 | |
| EP | 3301126 A1 | 4/2018 | |
| EP | 4337461 A1 | 3/2024 | |

| | | | |
|---|---|---|---|
| WO | 9967560 A1 | 12/1999 | |
| WO | 2010070324 A1 | 6/2010 | |
| WO | 2014040624 A1 | 3/2014 | |
| WO | 2015097422 A1 | 7/2015 | |
| WO | 2017000010 A1 | 1/2017 | |
| WO | 2021084236 A1 | 5/2021 | |
| WO | 2021188528 A1 | 9/2021 | |
| WO | 2022240863 A1 | 11/2022 | |

OTHER PUBLICATIONS

G. Hopf, et al., "Development of Multilayer Thermoplastic Fuel Lines With Improved Barrier Properties", Sae Technical Paper Series, Jan. 1, 1994 (19 pages).

P. Ge, et al., "Prediction of ultimate burst pressure and comparison of failure criteria for thermoplastic composite pipes", Earth and Environmental Science, Apr. 1, 2021, vol. 725, No. 1, IOP Publishing, pp. 1-9 (9 pages).

H. Li, et al., "Molecular Simulation on Permeation Behavior of CH4/CO2/H2S Mixture Gas in PVDF at Service Conditions", Polymers, Jan. 28, 2022, vol. 14, No. 3, 545, pp. 1-13 (13 pages).

"Thermoflex Composite Pipe", https://www.thermoflexpipe.com/products/thermoflex/ (5 pages).

B. Bulleri et al., "Engineering Thermoplastic—Liners", Paper presented at the Corrosion 2004, New Orleans, Louisiana, Mar. 2004, pp. 1-14 (14 pages).

S. P. Venkateswaran et al., "Expanded Service Temperature of Polymer Liners for Water Injection Pipelines", Paper presented at the Corrosion 2019, Nashville, Tennessee, USA, Mar. 2019 (14 pages).

G. R. Ruschau, "Novel Polymers for Applications as Liners", Paper presented at the Corrosion 2000, Orlando, Florida, Mar. 2000, pp. 1-13 (13 pages).

H. U. Khalid et al., "Permeation Damage of Polymer Liner in Oil and Gas Pipelines: A Review", Polymers, 2020, vol. 12, 2307, pp. 1-31 (31 pages).

Kau, James C., et al. "Polyketone polymers: a new liner material for corrosion control in oil and gas industry", InCORROSION 2000. Mar. 26, 2000, pp. 1-16, [16 Pages].

Stearman, Zach, et al. "Value Proposition of Polyketone Liners & Continuous Rod in Deviated Wells", Lightening Production Services. 2017, pp. 1-30, [30 Pages].

Williams, Jerry G., et al. "Composite Spoolable Pipe Development, Advancements, and Limitations", InOffshore Technology Conference 2000. May 1, 2000, pp. 1-16, [16 Pages].

"Poketone: Tubing wear & corrosion Solution for Oil & Gas Industry", Hyosung Chemical. pp: 1-3, [3 Pages].

Lin, Harrison, et al. "Influence of hygrothermal conditioning on the chemical structure and thermal mechanical properties of aliphatic polyketone", Polymer Degradation and Stability. Jun. 2020, pp. 1-6, [6 Pages].

Baron, J. J., et al. "Non-metallic liners for gas/condensate pipelines", InCorrosion 2000. Mar. 26, 2000, pp. 1-15, [15 Pages].

Venkateswaran, Sai P., et al. "Expanded Service Temperature of Polymer Liners for Water Injection Pipelines", InCorrosion 2019. Mar. 24, 2019, pp. 1-1, [1 Page].

International Search Report issued in International Application No. PCT/US2022/028577 dated Jul. 20, 2022 (3 pages).

Written Opinion issued in International Application No. PCT/US2022/028577 dated Jul. 20, 2022 (5 pages).

International Preliminary Report on Patentability in International Application No. PCT/US2022/028577 dated Nov. 13, 2023 (6 pages).

Veith, Cary A. "Advances in Aliphatic Polyketone Composites", SPE ACCE Presentation, Esprix Technologies. Sep. 8, 2017, pp. 1-37 [37 Pages].

Flaconnéche, B. et al., "Permeability, Diffusion and Solubility of Gases in Polyethylene, Polyamide 11 and Poly (vinylidene fluoride)"; Oil & Gas Science and Technology—Revue d'IFP Energies nouvelles; vol. 56, No. 3; pp. 261-278; 2001 (18 pages).

Office Action issued by the Canadian Patent Office for corresponding Canadian Patent application No. 3,222,138, mailed Dec. 3, 2024 (3 pages).

(56)         References Cited

OTHER PUBLICATIONS

International Search Report issued for corresponding international patent application No. PCT/US2024/028137, mailed Jul. 30, 2024 (5 pages).
Written Opinion issued for corresponding international patent application No. PCT/US2024/028137, mailed Jul. 30, 2024 (7 pages).
Office Action issued in Chinese Patent Application No. 202280048933. 0, mailed Oct. 15, 2025 (18 pages).

\* cited by examiner

MULTILAYER PERMEATION BARRIER FOR SPOOLABLE COMPOSITE PIPES

BACKGROUND

Spoolable composite pipes may be used for fluid transportation applications, including, in particular, offshore oil and gas production. After production, spoolable composite pipes may be spooled in reels and shipped in a truck loading to the field for installation. Spoolable composite pipes may include various products such as reinforced thermoplastic pipes (RTP), spoolable glass reinforced epoxy pipes (s-GRE), or thermoplastic composite pipe (TCP). Generally, in RTPs and s-GREs, the layers are either unbonded or semi-bonded, whereas in TCPs, all of the layers are melt-fused together to create a fully bonded structure. RTPs and s-GREs are normally qualified in accordance with API 15S standard requirements, whereas TCPs are normally qualified in accordance with DNVGL-ST-F119 requirements.

Spoolable composite pipes may be used in water applications in the oil and gas industry. These types of pipes are increasingly being introduced to fields where hydrocarbons are present with high level of water cut in addition to hydrogen sulfide, carbon dioxide, and methane mixtures. Accordingly, there exists a need for spoolable composite pipes with sufficient mechanical properties, such as modulus and strength, when exposed to high aromatic components at high temperatures.

SUMMARY

Certain embodiments of the disclosure will be described with reference to the accompanying drawings, where like reference numerals denote like elements. It should be understood, however, that the accompanying figures illustrate the various implementations described and are not meant to limit the scope of various technologies described.

In one aspect, embodiments herein are directed to spoolable composite pipes comprising: an inner extruded tubular liner, a backer layer surrounding the inner extruded tubular liner, and a reinforcement layer surrounding the backer layer. The backer layer includes a polypropylene, and the inner extruded tubular liner includes a thermoplastic. The inner diameter of the inner extruded tubular liner is greater than 3.5 inches.

In another aspect, a method of producing the spoolable composite pipe is provided, the method comprising co-extruding the thermoplastic with the backer layer to form the spoolable composite pipe, providing the reinforcement layer over the backer layer, and extruding the cover layer around the reinforcement layer.

In yet another aspect, a method is provided for transporting a hydrocarbon fluid comprising providing the spoolable composite pipe and introducing the hydrocarbon fluid in the spoolable composite pipe. The hydrocarbon fluid has an aromatic content of up to about 35% by volume based on the total hydrocarbons content.

In still another aspect, embodiments herein are directed to internally lined pipes, comprising an inner extruded tubular liner and a backer layer surrounding the inner extruded tubular liner. The backer layer comprises a polypropylene, and the inner extruded tubular liner comprises a thermoplastic. The internally lined pipe is configured to operate at temperatures of up to 110° C. The outer diameter of the backer layer is greater than 4 inches.

Other aspects and advantages of this disclosure will be apparent from the following description made with reference to the accompanying drawings and the appended claims.

DETAILED DESCRIPTION

Several strategies have been employed to improve the operating condition ratings of spoolable composite pipes. However, thermoplastics such as polyethylene, when used at high temperature in oil & gas environments, experience a reduction in mechanical properties, such as modulus and strength, due to the material degradation, for example matrix plasticization, as a result of aromatic hydrocarbon uptake or swelling.

There is a need for spoolable composite pipes capable of transporting fluids, such as may be used in the oil and gas industry, while maintaining desirable physical and mechanical properties when exposed to higher temperatures, high aromatic components, and in sour environments.

Pipes and methods of preparing them are presented using a thermoplastic in the lining material of spoolable composite pipes and a backer layer of polypropylene to provide pipes capable of operating at temperatures of up to 110° C. and carrying hydrocarbons having an aromatic content of up to 35% by volume based on the total hydrocarbons content, in particular for oil and gas flowlines applications. The thermoplastic may be what is known in the art as an engineering thermoplastic or high-performance thermoplastic.

In one or more embodiments, spoolable composite pipes are presented. These pipes may include an inner extruded tubular liner, a backer layer surrounding the inner extruded tubular liner, and a reinforcement layer surrounding the backer layer. The backer layer may be co-extruded with the inner extruded tubular liner. The inner extruded tubular liner may contain an engineering or high-performance thermoplastic. Such spoolable composite pipes may be configured to operate at temperatures of up to 110° C. and to carry hydrocarbons having an aromatic content of up to 35% by volume based on the total hydrocarbons content.

The inner extruded tubular liner acts as a permeation barrier to the different gases that may be encountered in oil and gas production, such as hydrogen sulfide ($H_2S$), carbon dioxide ($CO_2$), and methane ($CH_4$). The inner extruded tubular liner may also act as a permeation barrier to the permeation of liquid aromatics to the backer material, reducing swelling and degradation of the backer material. An engineering or high-performance thermoplastic with a low permeability to one or more of $H_2S$, $CO_2$, $CH_4$, and liquid aromatics serves to reduce the amount of gas that reaches the backer layer that could potentially degrade its performance.

Figure 1:
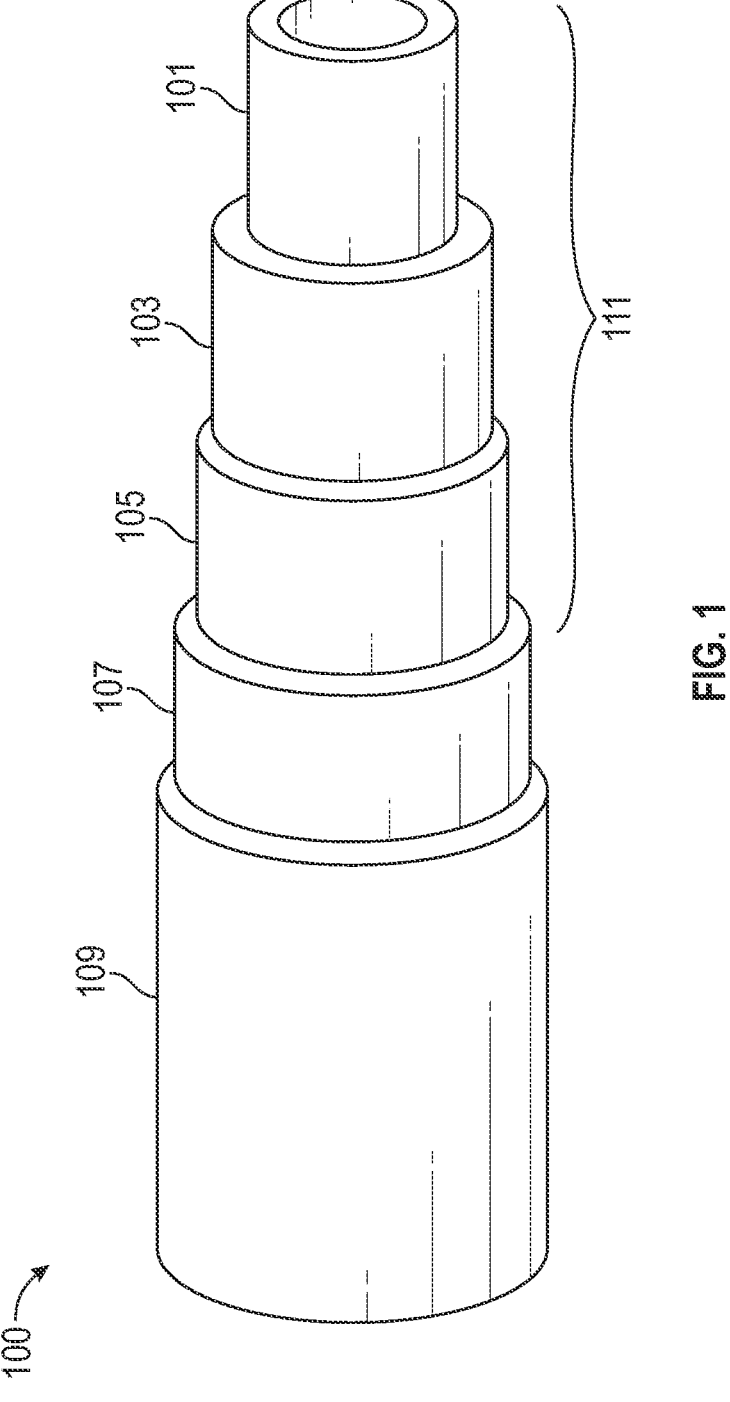
FIG. 1 illustrates a spoolable composite pipe according to one or more embodiments.

FIG. 1 illustrates a spoolable composite pipe 100 according to one or more embodiments. The spoolable composite pipe 100 includes an inner extruded tubular liner 101, a backer layer 105 surrounding the inner extruded tubular liner 101, and a reinforcement layer 109 surrounding the backer layer 105. The spoolable composite pipe 100 may optionally include a bonding or tie layer 103 between the inner extruded tubular liner 101 and the backer layer 105. Further, the spoolable composite pipe 100 may optionally include a bonding or tie layer 107 between the backer layer 105 and the reinforcement layer 109. The multi-layer inner pipe system 111 comprises the inner extruded tubular liner 101, the backer layer 105, and the optional bonding or tie layer 103.

The use of thermoplastic as a cost effective lining material or fluid permeation barrier for pipes for oil and gas flowlines operating at high temperatures, such as temperatures of up to 105° C., up to 110° C., or in a range with a lower temperature limit of 80° C., 85° C., or 90° C., and an upper temperature limit of 105° C. or 110° C., for carrying crude oil fluids having a high aromatic and cyclo-aliphatic content, such as up to 50% by volume based on the total hydrocarbons content, and where the aromatic content may be as high as 35% by volume based on the total hydrocarbons content. The environment of these composite pipes may be sweet, with limited hydrogen sulfide ($H_2S$) or sour with $H_2S$ partial pressure of up to 10 barg. As such, the inner extruded tubular liner may contain a thermoplastic.

In some embodiments, the thermoplastic comprises a semi-crystalline polymer. In one or more embodiments, the thermoplastic may comprise one or more of polyvinylidene fluoride (PVDF), polyphenylene sulfide (PPS), polyamide (PA), or aliphatic polyketones (POK). The thermoplastic may also comprise one or more other semi-crystalline thermoplastics, such as those in the polyaryl ether ketone family, including, but not limited to, polyether ketone (PEK), polyether ether ketone (PEEK), polyether ketone (PEKK), and blends thereof.

In some embodiments, the inner extruded tubular liners may be standalone thermoplastic extruded tubes as a monolayer system, or the thermoplastic may be co-extruded with other thermoplastic polymers as a multilayer system. For example, the liners may include a thin layer of thermoplastic as defined above, which may be the most inner layer in contact with the hydrocarbons of the crude oil fluid. Optional additional layers, which may be thicker than the inner layer of the inner extruded tubular liner, may be of the same material or they may include other thermoplastics or metals such as aluminum, for example. Additional bonding layers may be used to bond the optional additional layers to the other layers of the inner extruded tubular liner.

In one or more embodiments, the inner diameter of the inner extruded tubular liner may be greater than 3.5 inches (8.89 cm), greater than 4.0 inches (10.16 cm), greater than 5.0 inches (12.7 cm), or greater than 6.0 inches (15.24 cm), and may be less than 15 inches (38.1 cm), less than 12 inches (30.48 cm), or less than 10 inches (25.4 cm).

The inner extruded tubular lining material acts as a permeation barrier and comprises thermoplastics with a very low permeability to $CH_4$, $H_2S$, and $CO_2$. In addition, the lining material has a high mechanical strength and is resistant to bending and stretching. Further, the pipes having a lining material or fluid permeation barrier according to one or more embodiments have chemical resistance and may swell less than some conventional lining materials when contacted with hydrocarbons. The inner extruded tubular liner contacts the fluid within the pipe and, through its resistance to swelling and low permeability to various components, may serve to reduce migration of $CH_4$, $H_2S$, and $CO_2$, or hydrocarbons into subsequent outer layers of the pipe.

In one or more embodiments, the thickness of the inner extruded tubular liner may be in a range with a minimum value of any of 0.3 mm, 0.4 mm, 0.5 mm, or 0.6 mm, and a maximum value of any of 1.5 mm, 1.3 mm, 1.2 mm, or 1.0 mm.

A bonding layer may be included around the inner extruded tubular liner. The bonding layer allows the inner extruded tubular liner to chemically bond with a surrounding layer during the co-extrusion process. This material of the bonding layer may be selected to adhere the inner extruded tubular liner to other outer layers. In one or more embodiments, the thickness of the bonding layer may be in a range with a minimum value of any of 50 µm, 70 µm, 80 µm, 100 µm, 120 µm or 150 µm and a maximum value of any of 150 µm, 175 µm, 200 µm, 225 µm, 250 µm, 275 µm, or 300 µm.

A backer layer is located around the inner extruded tubular liner and comprises a polypropylene (PP). The backer layer may be significantly thicker than the inner extruded tubular liner, as it is designed to be the main component in the multi-layer structure to bear the loads that the multi-layer inner pipe system is subject to during operation.

The backer layer may comprise a homopolymer PP or a copolymer PP. The PP may be syndiotactic, atactic, isotactic, eutactic, or a combination of these.

Polypropylene may be used as in one or more embodiments because even when exposed to hydrocarbons at elevated temperature and pressure, it may retain a high maximum allowable operating temperature as defined by the mechanical properties along with a high tensile strength. In one or more embodiments, the use of polypropylene may also provide an ease of manufacture in part due to its low melting point that may be in a range of between 125° C. and 175° C.

As the inner extruded tubular liner acts as a permeation barrier to prevent migration of gases and to protect the backer layer, a thickness ratio between the inner extruded tubular liner and the backer layer may be developed through the following equations.

Figure 2A:
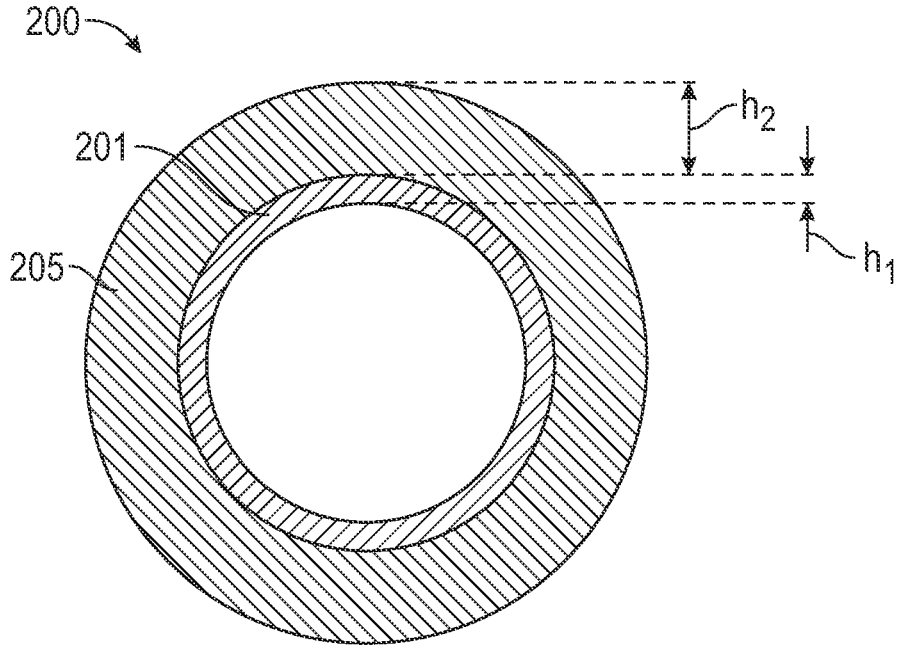
FIG. 2A depicts a cross sectional view of an embodiment of a multi-layer system with two adjacent polymer layers.
Figure 2B:
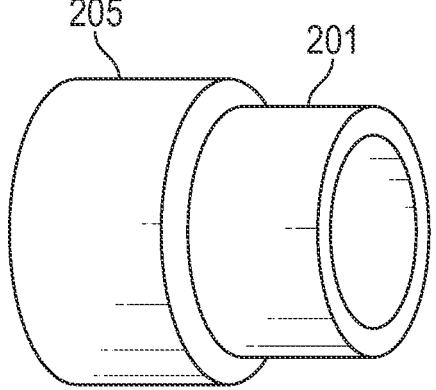
FIG. 2B depicts a side view of an embodiment of a multi-layer system with two adjacent polymer layers.

FIGS. 2A and 2B depict a multi-layer system 200 with two adjacent polymer layers, according to one or more embodiments. FIG. 2A shows a cross sectional view of the multi-layer system 200 whereas FIG. 2B shows a side view of the multi-layer system 200. The two adjacent polymer layers 201 and 205 are shown in FIG. 2A and FIG. 2B. Layer 201 corresponds to the previously described inner extruded tubular liner and layer 205 corresponds to the backer layer. The effective permeability of the multi-layer system of FIG. 2A and FIG. 2B to gas i may be expressed in Equation 1.

$$K_{eq\_i} = h\left(\frac{h_1}{K_{1i}} + \frac{h_2}{K_{2i}}\right)^{-1} \quad (1)$$

Here, $K_{eq\_i}$ is the effective permeability of gas i through the multi-layer system, $h_1$ and $h_2$ are the thicknesses of polymer layers 201 and 205 respectively, h is the combined thickness of the two layers, and $K_{1i}$ and $K_{2i}$ are the permeability coefficients of gas i through polymer layers 201 and 205, respectively. Equation 1 can be simplified using by defining a quantity α as:

$$\alpha = h_1/h \quad (2)$$

The quantity α defined in Equation 2 above is the ratio of the thickness of polymer layer 201 to the sum of the thicknesses of polymer layers 201 and 205.

Equation 1 can be simplified to $$K_{eq\_i}/K_{2i} = (\alpha K_r + (1 - \alpha))^{-1} \quad (3)$$

where $K_r$ is the ratio of the permeability in polymer layer 205 to the permeability in polymer layer 201.

Figure 3:
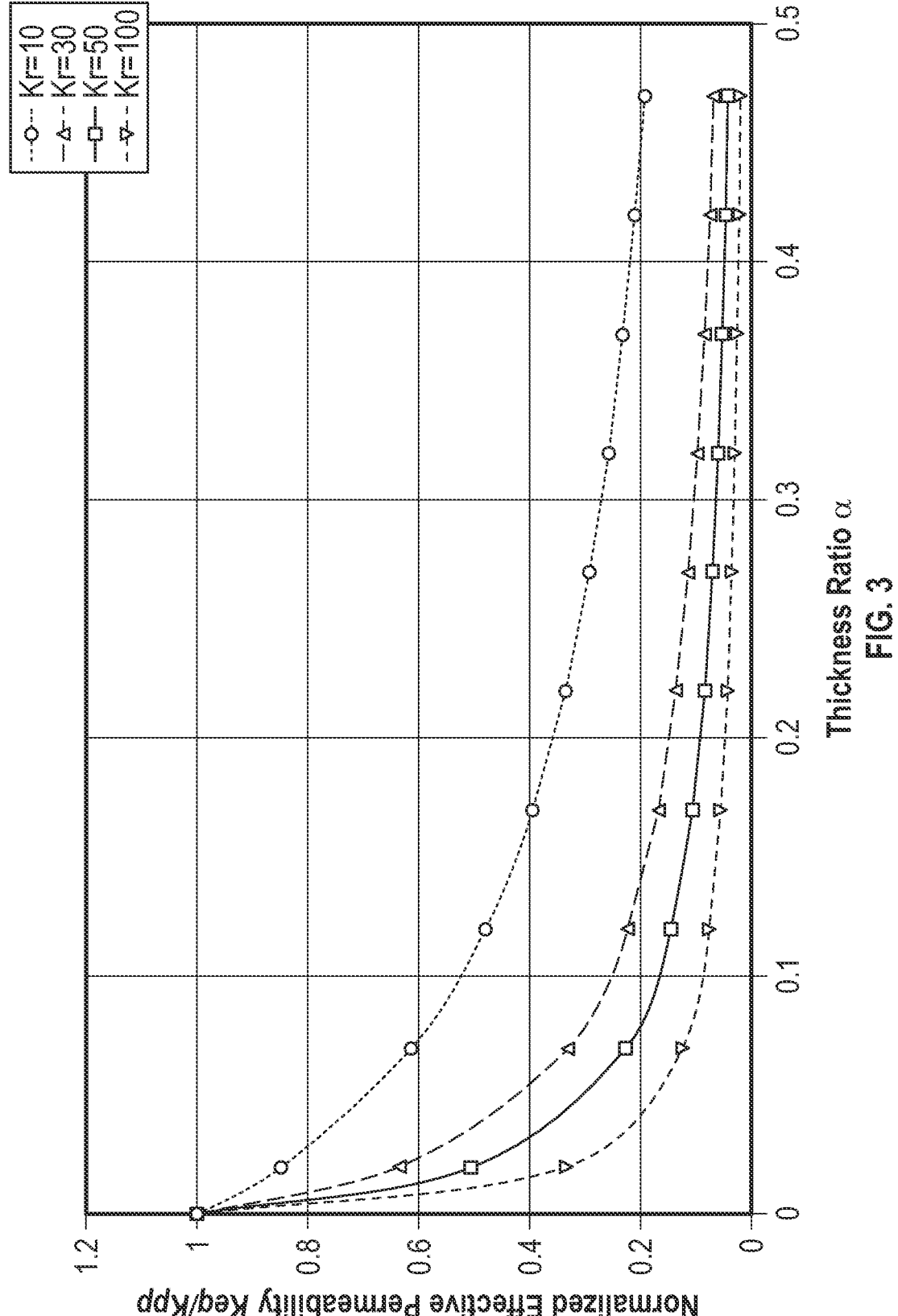
FIG. 3 is a generic plot of normalized permeability $K_{eq\_i}/K_{2i}$ of the multi-layer inner pipe system as a function of the thickness ratio $\alpha$, according to one or more embodiments.

FIG. 3 is a generic plot of normalized permeability $K_{eq\_i}/K_{2i}$ of the multi-layer inner pipe system as a function of the thickness ratio α, according to one or more embodiments. In one or more embodiments, a permeation barrier with a minimum value of the permeability ratio $K_r$ of 30 toward $H_2S$ requires a minimum thickness ratio α of about 15%. This produces a reduction of $H_2S$ permeation of over 80% when compared to neat PP. In one or more embodiments, the value of $K_r$ may be at least 30 and may be in a range of between 30 and 200. The range of the permeability ratio may be in a range with a maximum value of any of 200, 170, 150, and 100, and a minimum value of any of 30, 40, 50, 60, 70, 80 and 90.

The thickness ratio α, or the ratio of the thickness of the inner extruded tubular liner to the thickness of the backer layer plus the thickness of the inner extruded tubular line, is defined by Equation 2 above. The thickness ratio α may be in a range of between 4% and 25%. In one or more embodiments, the thickness ratio α may be in a range with a maximum value of any of 25%, 22%, 20%, 18%, 15%, 13%, 12%, 10%, or 9% and a minimum value of any of 4%, 5%, 6%, 7%, 8%, 9%, 10%, 12% and 15%, where any maximum value may be paired with any mathematically compatible minimum value. In some embodiments, the thickness from the inner side of the inner extruded tubular liner to the outer side of the backer layer may be in a range with a minimum value of any of 2 mm, 4 mm, 5 mm, and 7 mm and a maximum value of any of 25 mm, 22 mm, 20 mm, 15 mm and 10 mm.

Spoolable composite pipes may include an inner extruded tubular liner and a pipe comprising polypropylene as a backer layer surrounding the inner extruded tubular liner. The inner extruded tubular liner may comprise a thermoplastic. Such internally lined pipes may be configured to operate at temperatures of up to 105° C. or 110° C. and to carry hydrocarbons having an aromatic content of up to 35% by volume based on the total hydrocarbons content.

In some embodiments, there may be a reinforcement layer surrounding the backer layer. The reinforcement layer may include dry glass fibers, aramid fibers, carbon fibers, steel fibers or strips, glass-reinforced epoxy laminates or unidirectional thermoplastic composite tapes. In some embodiments, the reinforcement layer may include polyolefins, engineered thermoplastics, or thermoplastic polyesters.

A bonding layer may be included around the backer layer. The bonding layer allows the backer layer to chemically bond with the surrounding layer. This material of the bonding layer may be selected to adhere the backer layer to outer layers such as the reinforcement layer.

In one or more embodiments, there may be a cover surrounding the reinforcement layer. A bonding layer may be between the cover and the reinforcement layer to attach the cover to the reinforcement layer. The cover may comprise a polymeric or other material and may be extruded around the reinforcement layer. The production of the spoolable composite pipes may be a continuous process that may be carried out by co-extruding the inner extruded tubular liner and the backer layer, moving the inner extruded tubular liner and the backer layer to a winding station to place and consolidate the reinforcement layer, and extruding the cover around the reinforcement layer.

The configuration of the spoolable composite pipes may be unbonded, semi-bonded or fully bonded, meaning that they layers are unfused, semi-fused, or fully fused together via a heating process. In particular, the thermoplastic may be used as part of a fully bonded configuration where the backer layer, if thermoplastic-based, may be fully fused to the liner tube via a heating process. The inner extruded tubular liner and the backer layer may also be co-extruded in one or more embodiments. Alternatively, a bonding or tie layer may be used layer between the liner and the backer layer and/or between the backer layer and the cover.

In some embodiments, the spoolable composite pipes may be used for transporting hot, sour, wet hydrocarbons. The spoolable composite pipes may be configured to operate in a wet or dry gas environment that is sweet (having limited or no hydrogen sulfide) or sour (having a hydrogen sulfide partial pressure of up to 10 barg). Dry gas in this instance refers to natural gas whose hydrocarbon content is greater than 85% methane, whereas wet gas refers to natural gas whose hydrocarbon content is less than 85% methane. The spoolable composite pipes may have a permeability of less than 2·10-7 cm³ (STP)·cm/cm²s·bar when exposed to a dry gas environment comprising hydrogen sulfide, carbon dioxide, and methane, such as, for example 10% hydrogen sulfide, 10% carbon dioxide, and 80% methane. The inner extruded tubular liner allows the prevention of swelling of the backer layer while still retaining sufficient mechanical properties post-exposure to hydrocarbons. In particular, in some embodiments, the spoolable composite pipes retain the required mechanical properties post-exposure to highly aromatic hydrocarbons, from 35% to 50% by volume of aromatic hydrocarbons based on the total volume of hydrocarbons, at temperatures of up to 110° C., or from 90° C. to 110° C., while equally providing sufficient barrier performance to the permeation of hazardous gases such $H_2S$ and $CO_2$. In addition, the retention of modulus may avoid liner collapse in case of rapid gas decompression, noting that avoiding liner collapse generally involves the use of venting systems where the permeated gases are allowed to diffuse horizontally along the liner until the pipe connectors, then re-injected again into the transported stream.

In some embodiments, the present disclosure relates to methods of producing spoolable composite pipes for oil and gas flowlines as described above. The methods may include extruding a thermoplastic to form an inner tubular liner; forming a backer layer over the inner extruded tubular liner to form the spoolable composite pipe; and providing a reinforcement layer over the backer layer.

In one or more embodiments, the inner extruded tubular liner and the backing layer may be co-extruded to form the spoolable composite pipe.

In one or more embodiments a method of transporting a hydrocarbon fluid may be provided. Hydrocarbon fluid may be introduced into the spoolable composite pipe. The hydrocarbon fluid may have an aromatic content of up to about 35% by volume based on the total hydrocarbons content. In one or more embodiments, the hydrocarbon fluid may have an aromatic and cyclo-aliphatic content of up to about 50% by volume of the total hydrocarbons content. The hydrocarbon fluid may be at a temperature that is in a range with a lower limit of any of 80° C. 85° C., or 90° C. and an upper limit of 105° C. or 110° C. The hydrocarbon fluid may be a dry gas environment with a hydrogen sulfide partial pressure of up to 10 barg.

For static applications with a lack of cycling fatigue, the maximum temperature rating may be dictated by the temperature rating of the material of the inner extruded tubular liner in the specific environment of interest, determined via performance-based testing. The lower temperature rating may be determined by a drop in impact resistance at low temperature.

In some embodiments, the present disclosure relates to methods of transporting a hydrocarbon fluid having an aromatic content of up to 35% by volume based on the total hydrocarbons content. The method may include providing a spoolable composite pipe for oil and gas flowlines as described above and introducing the hydrocarbon fluid in the spoolable composite pipe. The method may alternatively include providing an internally lined pipe for oil and gas flowlines as described above and introducing the hydrocarbon fluid in the internally lined pipe.

Examples

A polymer ageing test protocol was carried out in accordance with ISO 23936 protocols but using a custom hydrocarbon composition. Tensile test samples (ISO 527 1BA) were immersed in a high-pressure autoclave exposed to a specific aromatic-rich hydrocarbon composition shown in Table 1 at 93° C. and 1500 psig. Polypropylene was aged for a total period of 90 days and retrieved every 15 days for weight uptake and length measurements. After full saturation, the polymers were extracted from the autoclave and immediately tested for tensile modulus/strength according to ISO 527 at different temperatures. PE-RT (XRT-70 supplied by TotalEnergies) was exposed to the same treatment and testing as a comparative example. The obtained values were then compared to those measured on the virgin (as-received) polymer and benchmarked against those measured on PE-RT.

TABLE 1

| Composition of the hydrocarbon environment with high aromatic content used in ageing tests. | | | |
|---|---|---|---|
| Ageing Conditions | Test Fluid (vol % (volume percent)) | Liquid Composition (vol %) | Gas Composition (mol % (mole percent)) |
| 93° C. (200° F.) at 1,500 psig | 70% Liquid 30% Gas | 25% Toluene 15% Cyclohexane 5% Ethylbenzene 5% Xylene 10% Water 40% IRM 902 | 100% $N_2$ |

Here, IRM 902 is a testing oil produced by R. E. Carroll, Inc, and refers to heavy hydrotreated naphthenic distillates.

Figure 4:
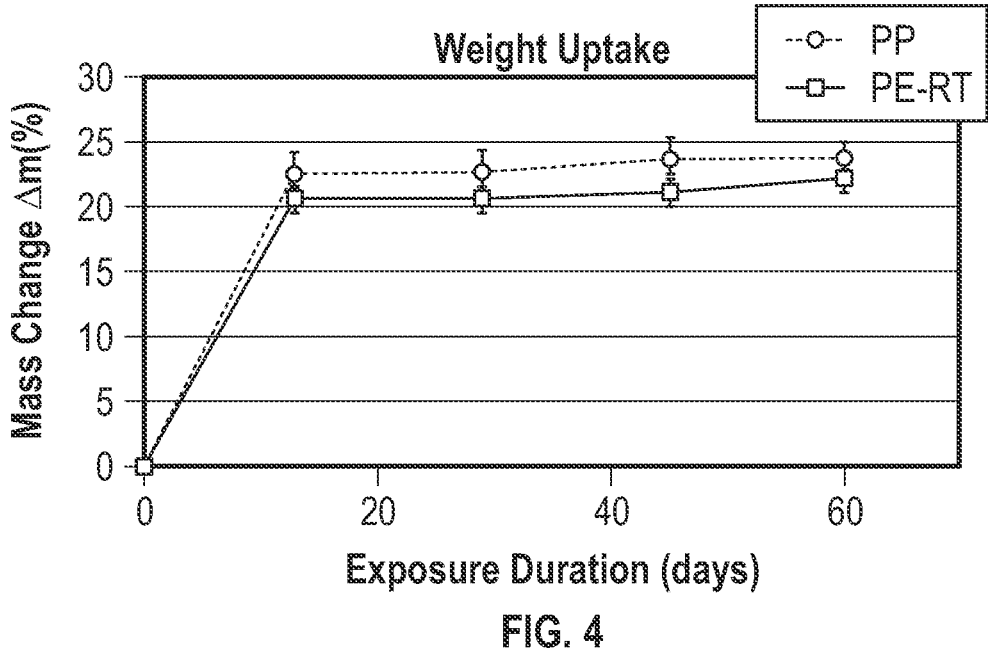
FIG. 4 is a depiction of weight uptake of different polymeric materials exposed to an aromatic hydrocarbon composition at 93° C. and 1500 psig.

FIG. 4 is a depiction of weight uptake of different example materials exposed to an aromatic hydrocarbon composition at 93° C. and 1500 psi according to one or more embodiments. Specifically, PP was exposed to the conditions of Table 1, with PE-RT being exposed to the same conditions as a comparative example. Similar weight uptake was observed for both polymers over the duration of the experiment.

Figure 5:
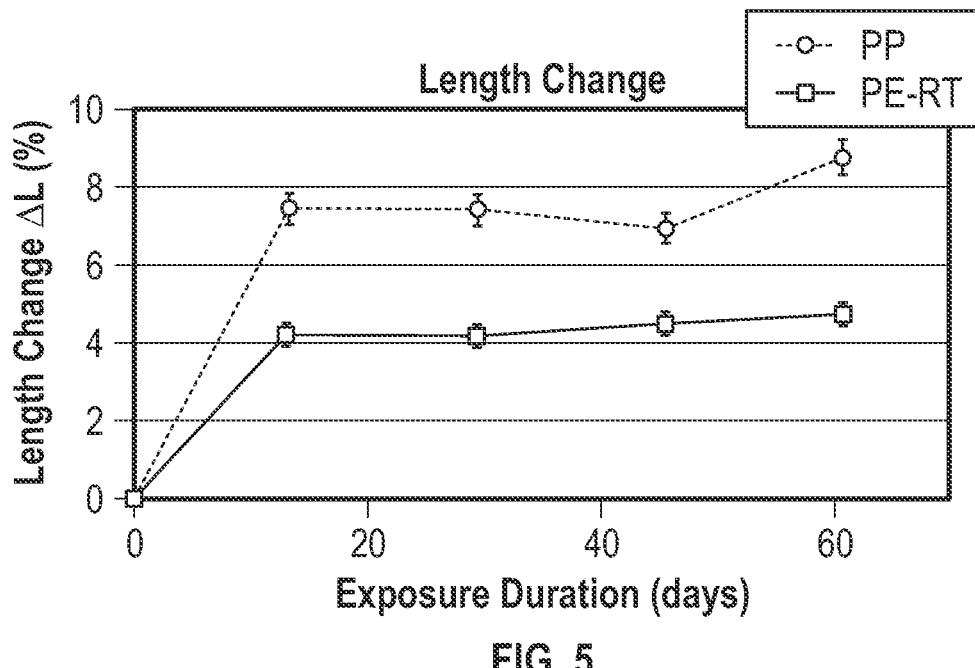
FIG. 5 is a depiction of length change of different polymeric materials exposed to an aromatic hydrocarbon composition at 93° C. and 1500 psig.

FIG. 5 is a depiction of length change of different example materials exposed to an aromatic hydrocarbon composition at 93° C. and 1500 psi according to one or more embodiments. PP was exposed to the conditions of Table 1, with PE-RT being exposed to the same conditions as a comparative example. PP had a larger increase in length than PE-RT during the experiment. Often, high levels of swelling in polyolefins may indicate increased matrix plasticization and a loss of mechanical properties.

The tested physical properties of PE-RT (CE1) and a PP (E1) are provided in Table 2 and Table 3.

TABLE 2

| Properties of virgin polymer | | | | | |
|---|---|---|---|---|---|
| Material | Test temperature | Maximum tensile stress, MPa | % of ambient stress | Young's modulus, MPa | % of ambient modulus |
| PE-RT (CE1) | 23° C. | 18.62 | 100.00 | 736.55 | 100.00 |
| PE-RT (CE1) | 82° C. | 6.48 | 34.79 | 125.85 | 17.09 |
| PE-RT (CE1) | 110° C. | — | — | — | — |
| PP (E1) | 23° C. | 29.92 | 100 | 1472.91 | 100.00 |
| PP (E1) | 93° C. | 10.33 | 35 | 307.38 | 20.87 |
| PP (E1) | 110° C. | 8.01 | 27 | 225.21 | 15.29 |

TABLE 3

| Properties of aged polymer | | | | | |
|---|---|---|---|---|---|
| Material | Test temperature | Maximum tensile stress, MPa | % of virgin stress at same T | Young's modulus, MPa | % of virgin modulus at same T |
| PE-RT (CE1) | 23° C. | 10.89 | 58.5 | 220.52 | 30 |
| PE-RT (CE1) | 82° C. | 3.59 | 55.5 | 49.29 | 39.1 |
| PE-RT (CE1) | 110° C. | — | — | — | — |

TABLE 3-continued

| | | Properties of aged polymer | | | |
|---|---|---|---|---|---|
| Material | Test temperature | Maximum tensile stress, MPa | % of virgin stress at same T | Young's modulus, MPa | % of virgin modulus at same T |
| PP (E1) | 23° C. | 19.66 | 65.7 | 463.95 | 31.5 |
| PP (E1) | 93° C. | 7.13 | 69 | 144.83 | 47.1 |
| PP (E1) | 110° C. | — | — | — | — |

Figure 6:
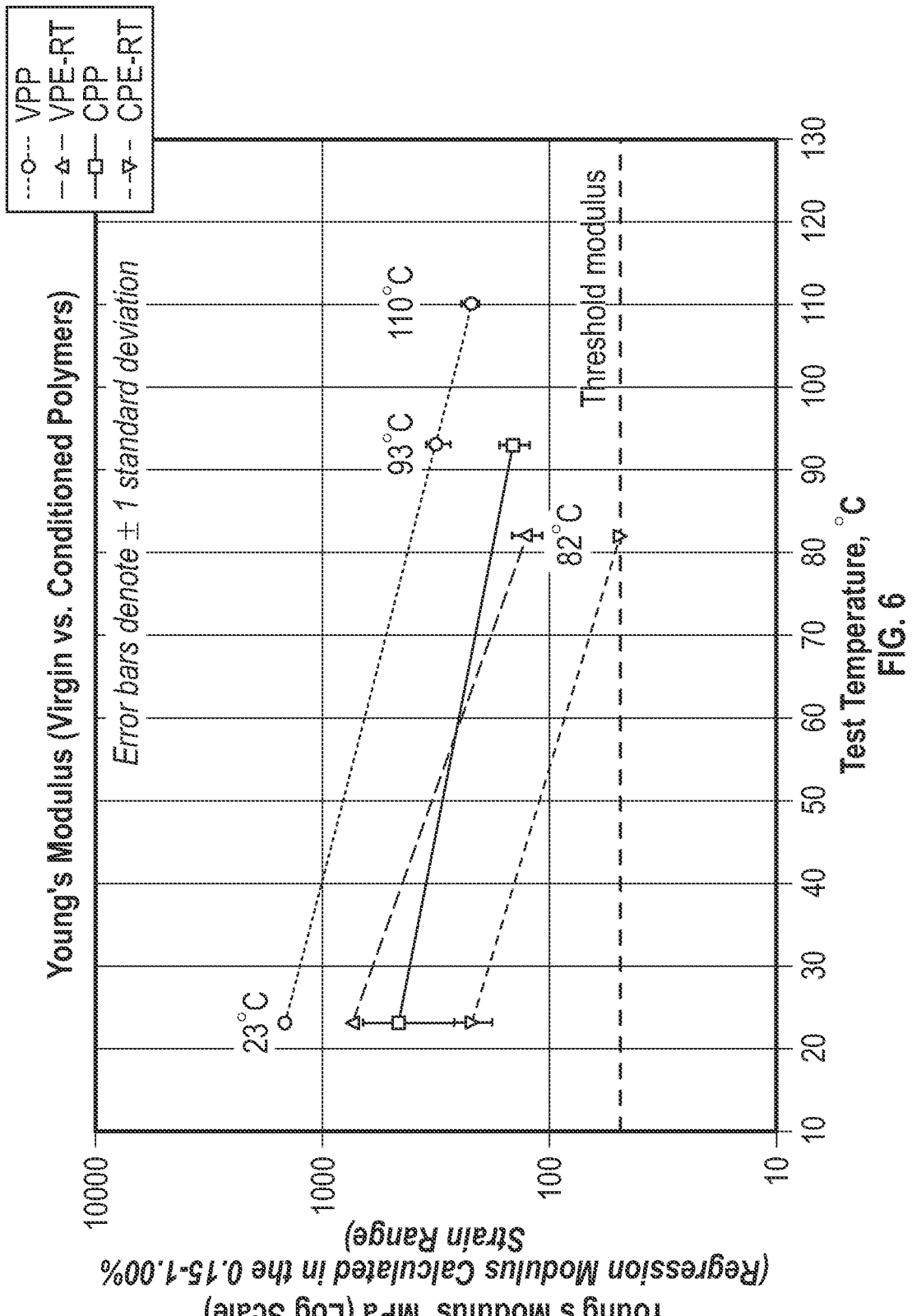
FIG. 6 is a plot of the tensile strength of virgin and conditioned polymeric materials exposed to various environments.
Figure 7:
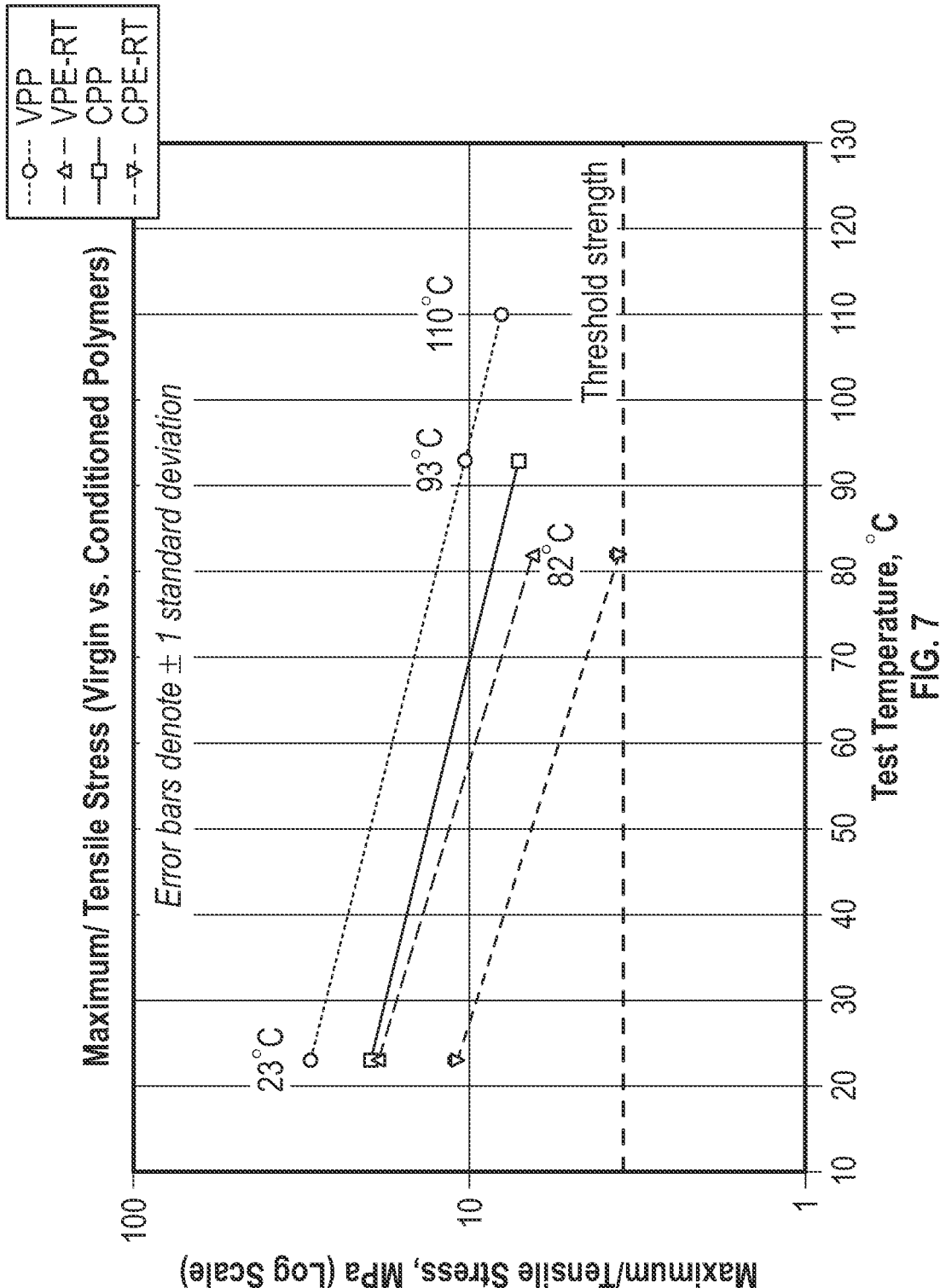
FIG. 7 is a plot of maximum tensile stress as a function of temperature for polymeric materials exposed to various environments.

Results in Tables 2 and 3 are provided in FIG. 6 and FIG. 7. FIG. 6 is a plot of the tensile strength of virgin and conditioned polymeric materials exposed to various environments. FIG. 7 is a plot of maximum tensile stress of virgin and conditioned polymeric materials exposed to various environments. As seen in FIG. 6 and FIG. 7, temperature reduces the tensile strength of PE-RT and PP exponentially. Furthermore, exposure to aromatic hydrocarbons at high temperatures, which resulted in swelling of both polymers as seen in FIG. 5, further reduces tensile modulus and strength for both polymers as compared with the retained properties in virgin polymers. However, as seen in Table 3 the retention of properties in aged polymers seems to be better for PP as compared to PE-RT.

Figure 8:
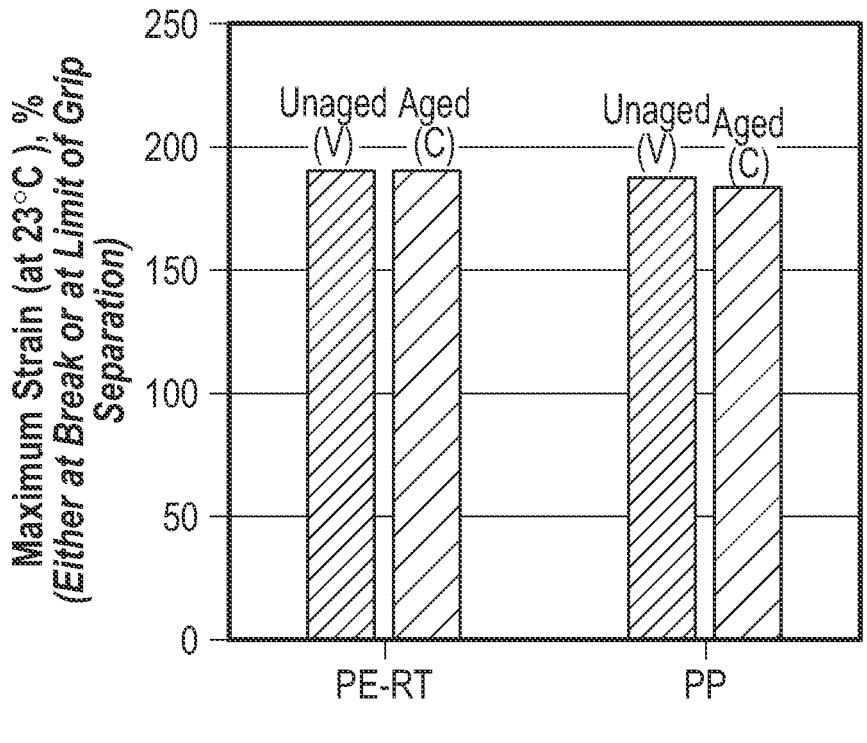
FIG. 8 is a depiction of maximum strain values of virgin and conditioned polymeric materials at 23° C.
Figure 9:
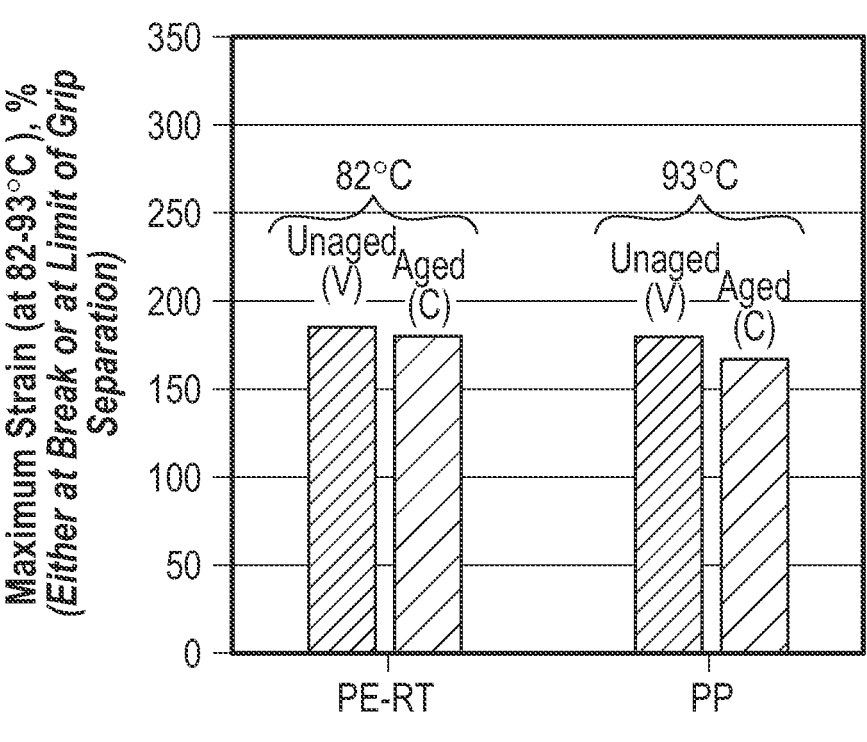
FIG. 9 is a depiction of maximum strain values of virgin and conditioned polymeric materials at 82° C. and 93° C.

FIG. 8 is a depiction of maximum strain values of virgin and conditioned polymeric materials at 23° C. FIG. 8 is a depiction of maximum strain values of virgin and conditioned polymeric materials at 82° C. and 93° C. for PE-RT and PP respectively. Results for FIG. 8 and FIG. 9 were recorded during tensile tests before (unaged) and after (aged) exposure to an aromatic hydrocarbon composition of Table 1 at 93° C. and 1500 psig for 90 days. Maximum strain was not necessarily recorded at break. If no failure occurred, it refers to the material reaching the maximum grip separation limit. Both polymers retained their ductility even after exposure to the aromatic hydrocarbon fluid. The measured mechanical properties of conditioned or aged PP at 93° C. and 110° C. for unconditioned PP are above the threshold values measured on aged PE-RT at 82° C. In addition, the PP does not exhibit significant embrittlement after ageing. A lack of embrittlement may be of particular importance, as material properties under strain may play a significant role in the design of pipes.

Figure 10:
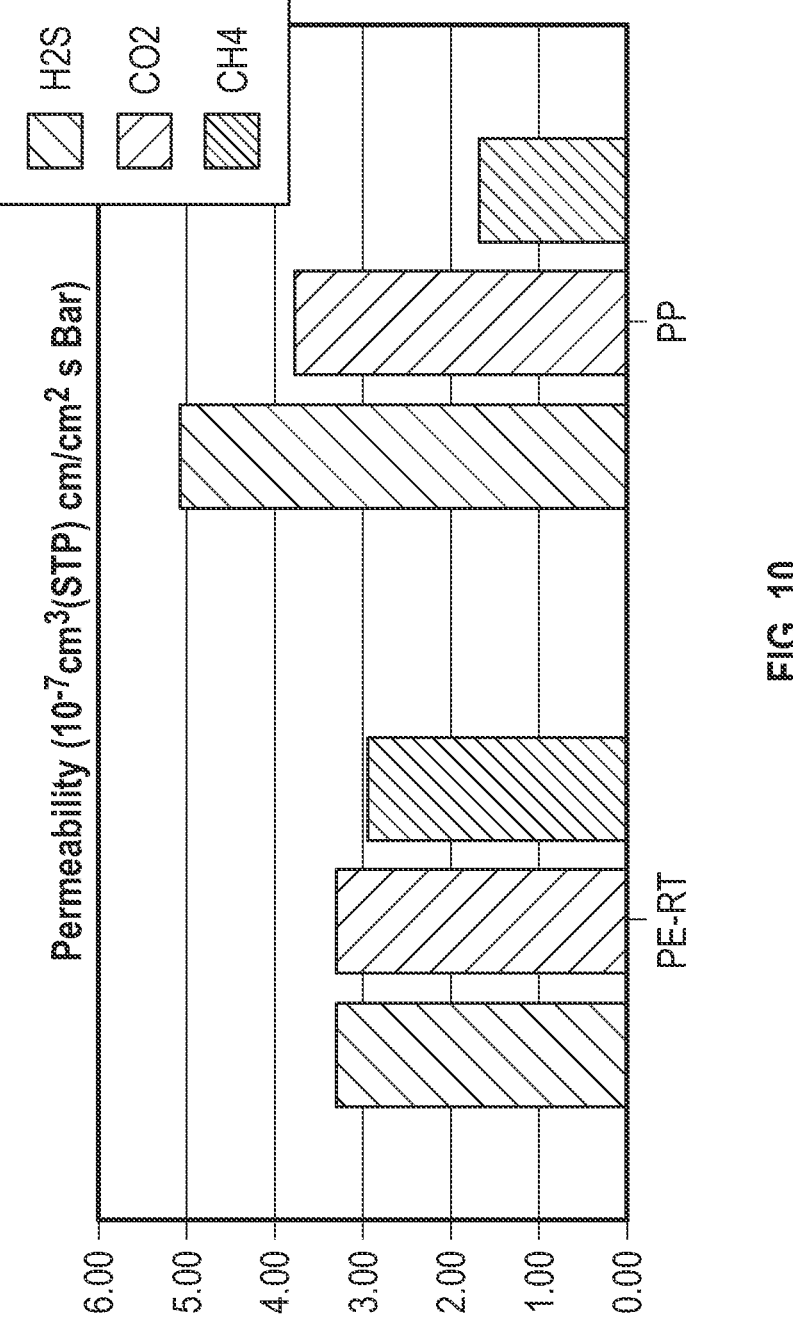
FIG. 10 is a plot of permeability of different polymeric materials to several gases according to one or more embodiments.

FIG. 10 is a plot of permeability of several polymeric materials to several gases according to one or more embodiments. The polypropylene shows a lower permeability for methane than PE-RT, a comparable permeability for carbon dioxide, and a greater permeability for $H_2S$.

Table 4 provides a summary of the order of magnitude of various permeability ratios of polypropylene and several thermoplastic materials under different gases according to one or more embodiments.

TABLE 4

| Permeability ratio $K_r$ (at 93° C. and 1500 psig) of different multi-layer constructions. The values indicate an order of magnitude (qualitative basis). | | |
|---|---|---|
| Gas | $K_r$ (PVDF-PP) | $K_r$ (PPS-PP) |
| $H_2S$ | 30 | 150 |
| $CO_2$ | 10 | 30 |
| $CH_4$ | 20 | 80 |

Figure 11:
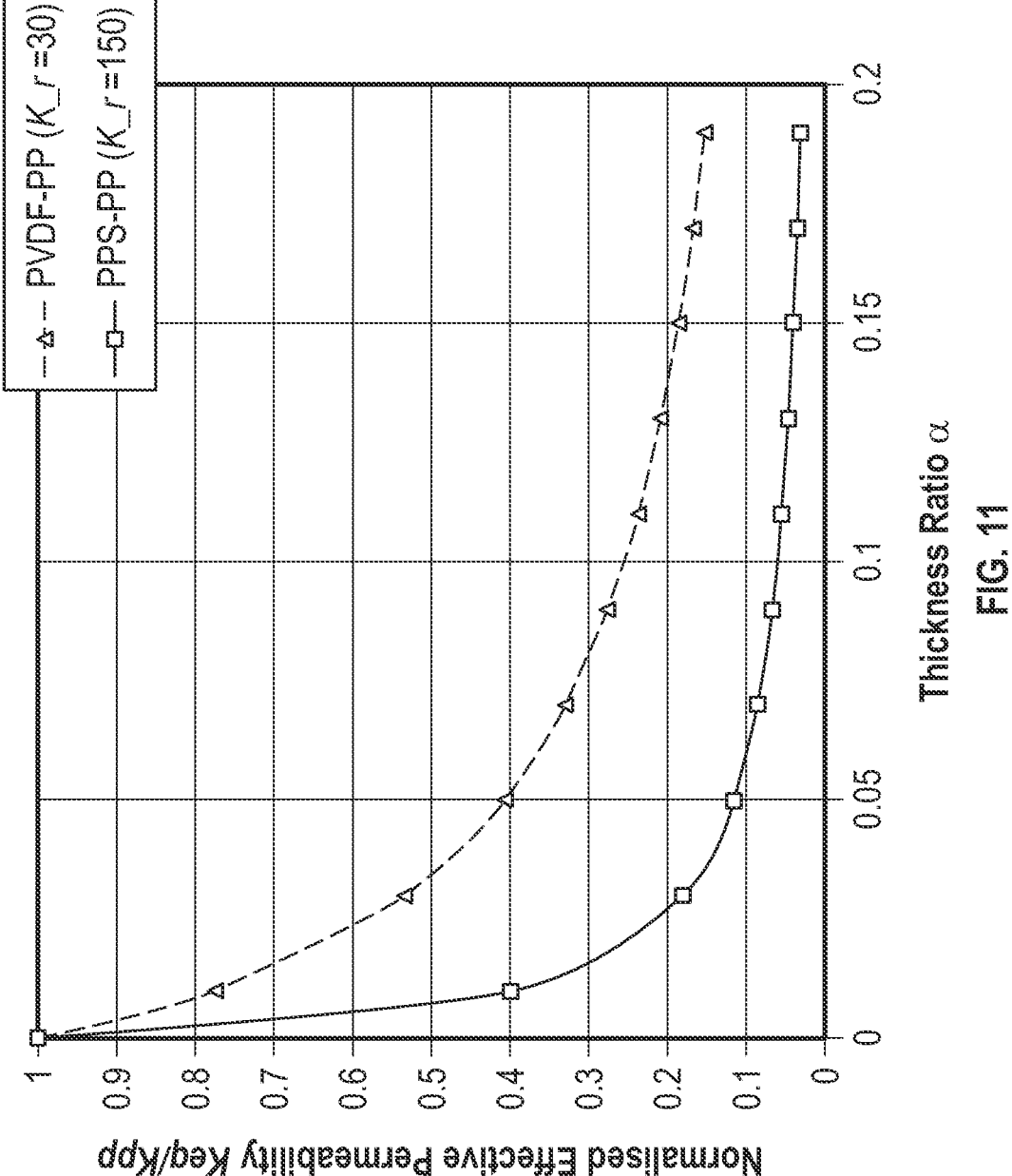
FIG. 11 is a plot of normalized permeability $K_{eq}/K_{pp}$ of different thermoplastics with a polypropylene of a multi-layer inner pipe system as a function of the thickness ratio $\alpha$, according to one or more embodiments.

FIG. 11 is a plot of normalized permeability $K_{eq}/K_{pp}$ of different thermoplastics with a polypropylene of a multilayer inner pipe system as a function of the thickness ratio α, according to one or more embodiments. As seen in Table 4 and FIG. 11, for a given thickness ratio, the PPS-PP system in this example shows better performance in terms of reduction in permeability. FIG. 11 shows that a permeation barrier with a minimum $K_r$ value of 30 towards $H_2S$-PP requires a minimum thickness ratio of about 15% (i.e., about 1 mm of thermoplastic on a 7 mm total inner extruded tubular liner and backer layer thickness) results in over 80% reduction of $H_2S$ permeation through the inner extruded tubular liner and backer layer when compared to neat polypropylene as a baseline.

While only a limited number of embodiments have been described, those skilled in the art having benefit of this disclosure will appreciate that other embodiments can be devised which do not depart from the scope of the disclosure.

Although the preceding description has been described here with reference to particular means, materials and embodiments, it is not intended to be limited to the particulars disclosed here; rather, it extends to all functionally equivalent structures, methods and uses, such as those within the scope of the appended claims.

The presently disclosed methods and compositions may suitably comprise, consist, or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes, and compositions belong.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" or "optional" mean that the subsequently described event or circumstances may or may not occur. The description includes instances where the event or circumstance occurs and instances where it does not occur.

When the words "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

The invention claimed is:

1. A spoolable composite pipe comprising:
an inner extruded tubular liner;
a backer layer surrounding the inner extruded tubular liner; and
a reinforcement layer surrounding the backer layer,
where the backer layer comprises a polypropylene;
where the inner extruded tubular liner comprises a thermoplastic selected from the group consisting of polyvinylidene fluoride, polyphenylene sulfide, polyketone, and polyamide; and
where an inner diameter of the inner extruded tubular liner is greater than 3.5 inches.

2. The spoolable composite pipe of claim 1, further comprising a cover layer surrounding the reinforcement layer.

3. The spoolable composite pipe of claim 2, further comprising a bonding layer between the reinforcement layer and the cover layer.

4. A method of producing the spoolable composite pipe for oil and gas flowlines of claim 2, the method comprising:
co-extruding the thermoplastic with the backer layer over the inner extruded tubular liner to form the spoolable composite pipe;
providing the reinforcement layer over the backer layer; and
extruding the cover layer around the reinforcement layer.

5. The spoolable composite pipe of claim 1, where a ratio of the thickness of the inner extruded tubular liner to the sum of the thickness of the inner extruded tubular liner and the thickness of the backer layer is in a range from 4% to 25%.

6. The spoolable composite pipe of claim 1, where a thickness from an inner side of the inner extruded tubular liner to an outer side of the backer layer is in a range of from 2 mm to 25 mm.

7. The spoolable composite pipe of claim 1, where the thermoplastic and the polypropylene have a permeability ratio of at least 30.

8. The spoolable composite pipe of claim 1, where the inner extruded tubular liner is a monolayer extruded tube.

9. The spoolable composite pipe of claim 1, further comprising a bonding layer between the inner extruded tubular liner and the backer layer.

10. The spoolable composite pipe of claim 1, where the inner extruded tubular liner and the backer layer are co-extruded.

11. The spoolable composite pipe of claim 1, where the spoolable composite pipe is unbonded, semi-bonded, or bonded.

12. The spoolable composite pipe of claim 1, where the reinforcement layer comprises a material selected from the group consisting of dry glass fibers, aramid fibers, carbon fibers, steel fibers or strips, glass-reinforced epoxy laminates, unidirectional thermoplastic composite tapes, and combinations thereof.

13. The spoolable composite pipe of claim 1, further comprising a bonding layer between the backer layer and the reinforcement layer.

14. A method of transporting a hydrocarbon fluid, the method comprising:
providing the spoolable composite pipe of claim 1; and
introducing the hydrocarbon fluid in the spoolable composite pipe,
wherein the hydrocarbon fluid has an aromatic content of up to about 35% by volume based on the total hydrocarbons content.

15. The method of claim 14, where the hydrocarbon fluid has an aromatic and cyclo-aliphatic content of up to about 50% by volume of the total hydrocarbons content.

16. The method of claim 14, where the hydrocarbon fluid is a dry gas environment having a hydrogen sulfide partial pressure of up to 10 barg.

17. The method of claim 14, where the hydrocarbon fluid is at a temperature that is in a range of from 80° C. to 110° C.

18. An internally lined pipe, comprising:
an inner extruded tubular liner; and
a backer layer surrounding the inner extruded tubular liner,
where the internally lined pipe is configured to operate at temperatures of up to 110° C.,
where the backer layer comprises a polypropylene;
where the inner extruded tubular liner comprises a thermoplastic selected from the group consisting of polyvinylidene fluoride, polyphenylene sulfide, polyketone, and polyamide, and
where an outer diameter of the backer layer is greater than 4 inches.

19. The internally lined pipe of claim 18, where a ratio of a permeability of the backer layer to a permeability of the inner extruded tubular liner is greater than 30.

20. The internally lined pipe of claim 18 configured to operate in a dry gas environment having a hydrogen sulfide partial pressure of up to 10 barg.

* * * * *